United States Patent
Abouali et al.

(10) Patent No.: US 12,077,157 B2
(45) Date of Patent: Sep. 3, 2024

(54) ADAPTIVE CRUISE CONTROL BASED ON INFORMATION ABOUT LOW VISIBILITY ZONES

(71) Applicant: Ford Global Technologies, LLC, Dearborn, MI (US)

(72) Inventors: Mohammad Abouali, Canton, MI (US); Jeremy Lerner, Southfield, MI (US); Scott Huggins, Novi, MI (US); Taylor Hawley, Oak Park, MI (US); Navid Tafaghodi Khajavi, Troy, MI (US); Danielle Rosenblatt, Dearborn, MI (US); Xingping Chen, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 17/241,292

(22) Filed: Apr. 27, 2021

(65) Prior Publication Data
US 2022/0340133 A1    Oct. 27, 2022

(51) Int. Cl.
| B60W 30/14 | (2006.01) |
| B60W 30/16 | (2020.01) |
| B60W 40/04 | (2006.01) |
| B60W 50/00 | (2006.01) |
| B60W 60/00 | (2020.01) |

(52) U.S. Cl.
CPC ....... *B60W 30/16* (2013.01); *B60W 2420/408* (2024.01); *B60W 2556/45* (2020.02)

(58) Field of Classification Search
CPC ............. B60W 30/16; B60W 2556/45; B60W 2420/52
See application file for complete search history.

(56) References Cited

U.S. PATENT DOCUMENTS

| 7,650,217 B2 | 1/2010 | Ueyama |
| 9,090,260 B2 | 7/2015 | Clarke et al. |
| 2009/0037362 A1 | 2/2009 | Lee et al. |
| 2015/0309510 A1* | 10/2015 | Cudak ................... B60W 30/16 701/28 |
| 2016/0046288 A1 | 2/2016 | Pawlicki et al. |
| (Continued) | | |

OTHER PUBLICATIONS

"Curve Speed Assist (CSA)," Adaptive Cruise Control, Driver support, S60 2020 Early, Volvo Support, Jan. 21, 2020, 3 pages.

*Primary Examiner* — Jess Whittington
*Assistant Examiner* — Rami Nabih Bedewi
(74) *Attorney, Agent, or Firm* — Frank A. MacKenzie; Bejin Bieneman PLC

(57) ABSTRACT

A system comprises a computer having a processor and a memory, the memory storing instructions executable by the processor to monitor a position of a vehicle while an adaptive cruise control feature of the vehicle is set to operate in a standard operation mode, identify, based on the position of the vehicle and on visibility zone information, a limited visibility zone in a route of travel of the vehicle, and cause the adaptive cruise control feature to operate in a modified operation mode while the vehicle is in the limited visibility zone, wherein during operation in the modified operation mode, the adaptive cruise control feature operates in accordance with one or more modified operating parameters.

19 Claims, 7 Drawing Sheets

(56) References Cited

U.S. PATENT DOCUMENTS

| | | | |
|---|---|---|---|
| 2016/0104381 A1* | 4/2016 | Nath | B60W 40/04 |
| | | | 701/23 |
| 2017/0297566 A1* | 10/2017 | Matsumura | B60W 30/08 |
| 2017/0297567 A1* | 10/2017 | Matsumura | B60W 40/08 |
| 2018/0198955 A1* | 7/2018 | Watanabe | G08G 1/16 |
| 2019/0219691 A1* | 7/2019 | Meehan | G01W 1/06 |
| 2020/0262438 A1* | 8/2020 | Bai | G08G 1/048 |
| 2020/0269864 A1* | 8/2020 | Zhang | B60W 30/18154 |
| 2020/0356100 A1* | 11/2020 | Nagarajan | G01C 21/3602 |
| 2021/0142526 A1* | 5/2021 | Mantyjarvi | G06T 11/00 |
| 2021/0213948 A1* | 7/2021 | Lahti | G05D 1/0293 |
| 2022/0017089 A1* | 1/2022 | Aikawa | B60K 31/0008 |
| 2022/0024492 A1* | 1/2022 | Panttila | B60W 60/0016 |
| 2022/0097697 A1* | 3/2022 | Wang | B60K 31/0008 |
| 2022/0274613 A1* | 9/2022 | White | B60W 60/0054 |

* cited by examiner

FIG. 7

Storage Medium 700

Computer-Executable Instructions for 600

ADAPTIVE CRUISE CONTROL BASED ON INFORMATION ABOUT LOW VISIBILITY ZONES

BACKGROUND

Adaptive cruise control is a vehicle feature that, when engaged, controls vehicle propulsion power/acceleration in order to maintain a set speed when possible, while monitoring the road in front of the vehicle in order to detect other vehicles that may be present. When the adaptive cruise control feature detects the presence of a slower-moving vehicle in front of the controlled vehicle, it can temporarily reduce the speed of the controlled vehicle below the set speed in order to maintain a desired minimum following distance. Subsequently, if the adaptive cruise control feature detects that the road in front of the vehicle has become clear, it can cause the vehicle to accelerate back up to the set speed.

BRIEF DESCRIPTION OF THE DRAWINGS

FIG. 7 is a block diagram of an example storage medium.

DETAILED DESCRIPTION

Figure 1:
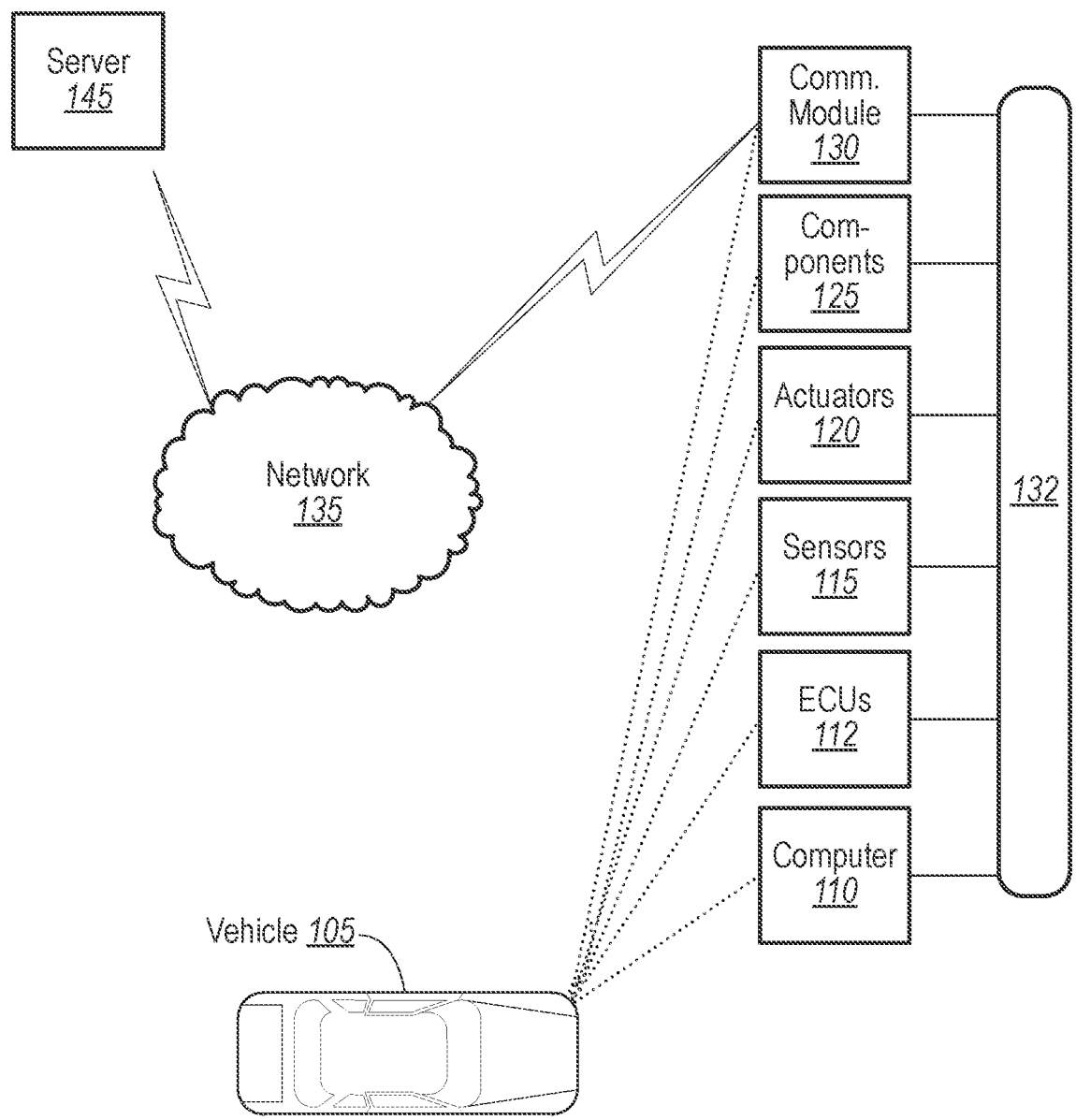
FIG. 1 is a block diagram of a first example system.

Disclosed herein are techniques for intelligent adaptive cruise control that can improve efficiencies in situations in which camera and/or radar sensor visibility is limited, e.g. due to roadway curvature and/or the presence of vision-obstructing obstacles. According to such techniques, in order to avoid the repetitive acceleration and deceleration that conventional adaptive cruise control systems can cause in limited-visibility conditions, an adaptive cruise control feature of a vehicle can operate in a modified operation mode. In the modified operation mode, the adaptive cruise control feature can operate according to modified operating parameters selected so as to avoid/mitigate unnecessary acceleration and deceleration in limited visibility conditions. The adaptive cruise control feature can predict zones of limited visibility based on received information describing locations of such zones, and can proactively transition to the modified operation mode in conjunction with entering such zones, resulting in smoother and more efficient vehicle operation.

A system can comprise a computer having a processor and a memory, the memory storing instructions executable by the processor to monitor a position of a vehicle while an adaptive cruise control feature of the vehicle is set to operate in a standard operation mode, identify, based on the position of the vehicle and on visibility zone information, a limited visibility zone in a route of travel of the vehicle, and cause the adaptive cruise control feature to operate in a modified operation mode while the vehicle is in and/or approaching the limited visibility zone, wherein during operation in the modified operation mode, the adaptive cruise control feature operates in accordance with one or more modified operating parameters.

The modified operating parameters can include a modified acceleration parameter.

The modified operating parameters can include a modified acceleration delay parameter.

The modified operating parameters can include a modified following distance parameter.

The modified operating parameters can include one or more modified sensor orientation parameters.

The modified operating parameters can include a modified object detection tolerance parameter.

The modified operating parameters can include a modified operating parameter providing the adaptive cruise control feature with a capability to control vehicle speed based on radar sensor information without confirmation from visual sensor information while operating in the modified operation mode.

The computer can receive the visibility zone information from a remote server.

The computer can receive the visibility zone information from the remote server via a wireless communication link.

The memory can store instructions executable by the processor to cause the adaptive cruise control feature to revert to the standard operation mode responsive to a determination that the vehicle has exited the limited visibility zone.

A method can comprise monitoring a position of a vehicle while an adaptive cruise control feature of the vehicle is set to operate in a standard operation mode, identifying, based on the position of the vehicle and on visibility zone information, a limited visibility zone in a route of travel of the vehicle, and causing the adaptive cruise control feature to operate in a modified operation mode while the vehicle is in and/or approaching the limited visibility zone, wherein during operation in the modified operation mode, the adaptive cruise control feature operates in accordance with one or more modified operating parameters.

The modified operating parameters can include a modified acceleration parameter.

The modified operating parameters can include a modified acceleration delay parameter.

The modified operating parameters can include a modified following distance parameter.

The modified operating parameters can include one or more modified sensor orientation parameters.

The modified operating parameters can include a modified object detection tolerance parameter.

The modified operating parameters can include a modified operating parameter providing the adaptive cruise control feature with a capability to control vehicle speed based on radar sensor information without confirmation from visual sensor information while operating in the modified operation mode.

The method can comprise receiving the visibility zone information from a remote server.

The method can comprise receiving the visibility zone information from the remote server via a wireless communication link.

The method can comprise reverting to the standard operation mode responsive to a determination that the vehicle has exited the limited visibility zone.

FIG. 1 is a block diagram of an example vehicle system 100. The system 100 includes a vehicle 105, which is a land vehicle such as a car, truck, etc. The vehicle 105 includes a computer 110, electronic control units (ECUs) 112, vehicle sensors 115, actuators 120 to actuate various vehicle components 125, a communications module 130, and a vehicle network 132. Communications module 130 allows vehicle 105 to communicate with a server 145 via a network 135.

The computer 110 includes a processor and a memory. The memory includes one or more forms of computer-readable media, and stores instructions executable by the processor for performing various operations, including as disclosed herein. The processor can be implemented using any suitable processor or logic device, such as a complex instruction set computer (CISC) microprocessor, a reduced instruction set computing (RISC) microprocessor, a very long instruction word (VLIW) microprocessor, an x86 instruction set compatible processor, a processor implementing a combination of instruction sets, a multi-core processor, or any other suitable microprocessor or central processing unit (CPU). The processor also can be implemented as a dedicated processor, such as a controller, a microcontroller, an embedded processor, a chip multiprocessor (CMP), a co-processor, a graphics processor, a graphics processing unit (GPU), a digital signal processor (DSP), a network processor, a media processor, an input/output (I/O) processor, a media access control (MAC) processor, a radio baseband processor, an application specific integrated circuit (ASIC), a field programmable gate array (FPGA), a programmable logic device (PLD), and so forth. In some implementations, computer 110 can include multiple processors, each one of which can be implemented according to any of the examples above.

The computer 110 may operate vehicle 105 in an autonomous, a semi-autonomous mode, or a non-autonomous (manual) mode, i.e., can control and/or monitor operation of the vehicle 105, including controlling and/or monitoring components 125. For purposes of this disclosure, an autonomous mode is defined as one in which each of vehicle propulsion, braking, and steering are controlled by the computer 110; in a semi-autonomous mode the computer 110 controls one or two of vehicle propulsion, braking, and steering; in a non-autonomous mode a human operator controls each of vehicle propulsion, braking, and steering.

The computer 110 may include programming to operate one or more of vehicle brakes, propulsion (e.g., control of acceleration in the vehicle by controlling one or more of an internal combustion engine, electric motor, hybrid powertrain, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may be communicatively coupled to, e.g., via vehicle network 132 as described further below, one or more processors located in other device(s) included in the vehicle 105. Further, the computer 110 may communicate, via communications module 130, with a navigation system that uses the Global Position System (GPS). As an example, the computer 110 may request and receive location data of the vehicle 105. The location data may be in a conventional format, e.g., geo-coordinates (latitudinal and longitudinal coordinates).

ECUs 112 (which can also be referred to as electronic control modules (ECMs) or simply as "control modules") are computing devices that monitor and/or control various vehicle components 125 of vehicle 105. Examples of ECUs 112 can include an engine control module, a transmission control module, a powertrain control module, a brake control module, a steering control module, and so forth. An ECU 112 can include a processor and a memory. The memory can include one or more forms of computer-readable media, and can store instructions executable by the processor for performing various operations, including as disclosed herein. The processor of any particular ECU 112 can be implemented using a general-purpose processor or a dedicated processor or processing circuitry, including any of the examples identified above in reference to a processor included in computer 110.

In some implementations, the processor of a particular ECU 112 can be implemented using a microcontroller. In some implementations, the processor of a particular ECU 112 can be implemented using a dedicated electronic circuit including an ASIC that is manufactured for a particular operation, e.g., an ASIC for processing sensor data and/or communicating the sensor data. In some implementations, the processor of a particular ECU 112 can be implemented using an FPGA, which is an integrated circuit manufactured to be configurable by an occupant. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of general-purpose processor(s), ASIC(s), and/or FPGA circuits may be included in a particular ECU 112.

Vehicle network 132 is a network via which messages can be exchanged between various devices in vehicle 105. Computer 110 can be generally programmed to send and/or receive, via vehicle network 132, messages to and/or from other devices in vehicle 105 (e.g., any or all of ECUs 112, sensors 115, actuators 120, components 125, communications module 130, a human machine interface (HMI), etc.). Additionally or alternatively, messages can be exchanged among various such other devices in vehicle 105 via vehicle network 132. In cases in which computer 110 actually comprises a plurality of devices, vehicle network 132 may be used for communications between devices represented as computer 110 in this disclosure. Further, as mentioned below, various controllers and/or vehicle sensors 115 may provide data to the computer 110.

In some implementations, vehicle network 132 can be a network in which messages are conveyed via a vehicle communications bus. For example, vehicle network can include a controller area network (CAN) in which messages are conveyed via a CAN bus, or a local interconnect network (LIN) in which messages are conveyed via a LIN bus.

In some implementations, vehicle network 132 can include a network in which messages are conveyed using other wired communication technologies and/or wireless communication technologies (e.g., Ethernet, WiFi, Bluetooth, etc.). Additional examples of protocols that may be used for communications over vehicle network 132 in some implementations include, without limitation, Media Oriented System Transport (MOST), Time-Triggered Protocol (TTP), and FlexRay.

In some implementations, vehicle network 132 can represent a combination of multiple networks, possibly of different types, that support communications among devices in vehicle 105. For example, vehicle network 132 can include a CAN in which some devices in vehicle 105 communicate via a CAN bus, and a wired or wireless local area network in which some device in vehicle 105 communicate according to Ethernet or Wi-Fi communication protocols.

Vehicle sensors 115 may include a variety of devices such as are known to provide data to the computer 110. For example, the vehicle sensors 115 may include Light Detection and Ranging (lidar) sensor(s) 115, etc., disposed on a top of the vehicle 105, behind a vehicle 105 front windshield, around the vehicle 105, etc., that provide relative locations, sizes, and shapes of objects and/or conditions surrounding the vehicle 105. As another example, one or more radar sensors 115 fixed to vehicle 105 bumpers may provide data to provide and range velocity of objects (possibly including second vehicles), etc., relative to the location of the vehicle 105. The vehicle sensors 115 may further include camera sensor(s) 115, e.g., front view, side view, rear view, etc., providing images from a field of view inside and/or outside the vehicle 105.

Actuators 120 are implemented via circuitry, chips, motors, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

In addition, the computer 110 may be configured for communicating via communication module 130 with devices outside of the vehicle 105, e.g., through vehicle-to-vehicle (V2V) or vehicle-to-infrastructure (V2X) wireless communications to another vehicle, to (typically via the network 135) a remote server 145. The communications module 130 could include one or more mechanisms by which the computer 110 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth®, IEEE 802.11, dedicated short range communications (DSRC), and/or wide area networks (WAN), including the Internet, providing data communication services.

The network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth, Bluetooth Low Energy (BLE), IEEE 802.11, vehicle-to-vehicle (V2V) such as Dedicated Short-Range Communications (DSRC) and cellular V2V (CV2V), cellular V2X (CV2X), etc.), local area networks (LAN) and/or wide area networks (WAN), including the Internet, providing data communication services.

Computer 110 can receive and analyze data from sensors 115 substantially continuously, periodically, and/or when instructed by a server 145, etc. Further, object classification or identification techniques can be used, e.g., in a computer 110 based on lidar sensor 115, camera sensor 115, etc., data, to identify a type of object, e.g., vehicle, person, rock, pothole, bicycle, motorcycle, etc., as well as physical features of objects.

Figure 2:
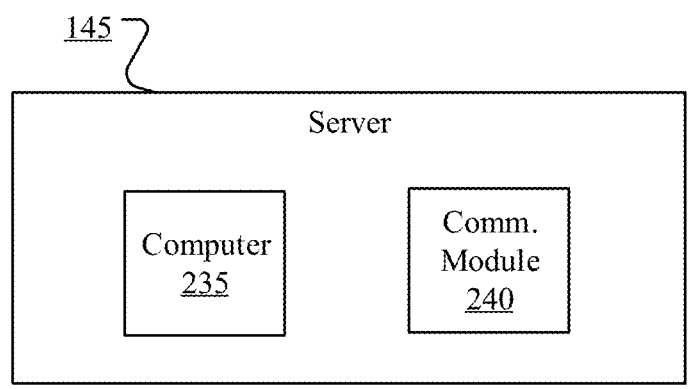
FIG. 2 is a block diagram of an example server.

FIG. 2 is a block diagram of an example server 145. The server 145 includes a computer 235 and a communications module 240. The computer 235 includes a processor and a memory. The memory includes one or more forms of computer-readable media, and stores instructions executable by the computer 235 for performing various operations, including as disclosed herein. The communications module 240 allows the computer 235 to communicate with other devices, such as the vehicle 105.

Figure 3A:
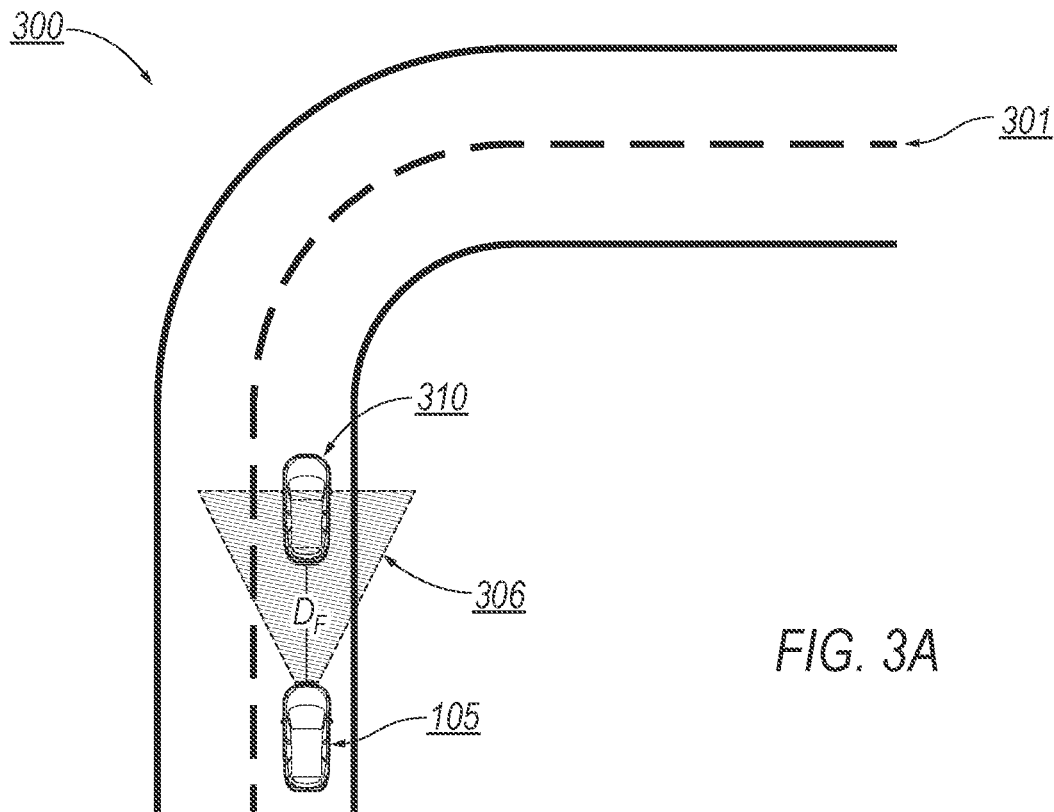
FIG. 3A is a diagram of a first example traffic scene.

FIG. 3A is a diagram of an example traffic scene 300. In traffic scene 300, vehicle 105 travels a straight portion of a roadway 301. An adaptive cruise control feature of vehicle 105 is set to maintain a target speed $S_T$. Ahead of vehicle 105 on roadway 301 is a vehicle 310, traveling at a speed $S_L$ that is less than vehicle 105's target speed $S_T$. Vehicle 310 is within a field of view (FoV) 306 of a front-facing camera and front-facing radar sensor of vehicle 105, enabling vehicle 105 to detect the presence of vehicle 310 and its position relative to vehicle 105. The adaptive cruise control feature of vehicle 105 controls engine power/acceleration at vehicle 105 in order to maintain a following distance $D_F$ between vehicle 105 and vehicle 310. Since vehicle 310 is moving at a speed $S_L$ that is less than the target speed $S_T$ set at vehicle 105, maintaining following distance $D_F$ involves reducing the speed of vehicle 105 to a speed lower than target speed $S_T$.

Figure 3B:
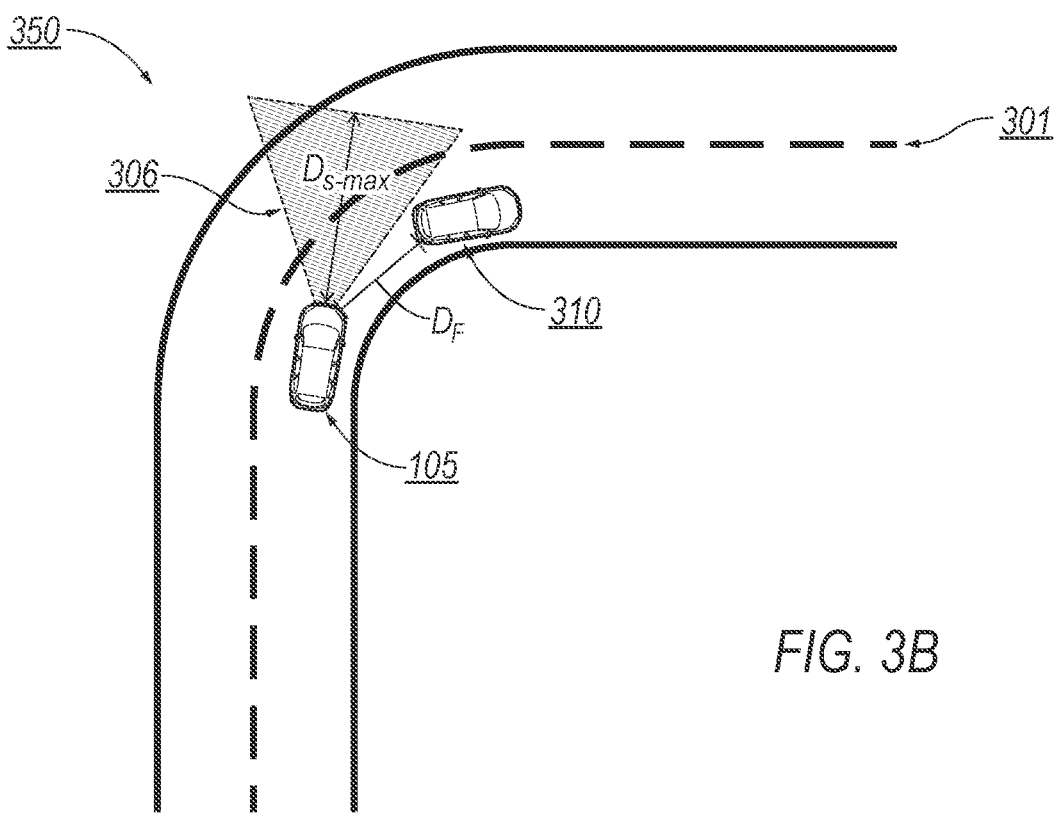
FIG. 3B is a diagram of a second example traffic scene.

FIG. 3B is a diagram of a second example traffic scene 350. In traffic scene 350, vehicle 105 and vehicle 310 of FIG. 3A have advanced to a sharply-curved portion of roadway 301. Due to the curvature of roadway 301, vehicle 310 is outside the FoV 306 of the front-facing camera and front-facing radar sensor of vehicle 105. Within FoV 306, roadway 301 is clear from vehicle 105 out to a maximum sensing distance $D_{s-max}$ of the front-facing camera and front-facing radar sensor of vehicle 105. As such, from the perspective of vehicle 105, it appears that vehicle 310 is no longer in front of vehicle 105. In reality, however, vehicle 310 is still only the following distance $D_F$ from vehicle 105.

Based on the misleading absence of vehicle 310 from FoV 306, the adaptive cruise control feature of vehicle 105 may conclude that roadway 301 is clear for a sufficient distance in front of vehicle 105 to permit acceleration of vehicle 105 back up to the target speed $S_T$ of vehicle 105 that is greater than the speed $S_L$ of vehicle 310. As a result, vehicle 105 may gain on vehicle 310 as the two vehicles navigate the sharply-curved portion of roadway 301, and may close to within a distance from vehicle 310 that is less than the desired following distance DF. As the vehicles emerge from the sharply-curved portion of roadway 301 onto a subsequent straight portion of roadway 301, vehicle 310 may suddenly (from the perspective of vehicle 105) reappear within FoV 306, at a position closer than the desired following distance DF. The adaptive cruise control feature of vehicle 105 may then decelerate vehicle 105 in order to reestablish following distance DF.

In the scenario illustrated in FIG. 3B, the visibility of vehicle 310 to sensors (e.g., front-facing camera, front-facing radar sensor, corner radar sensors, etc.) of vehicle 310 is compromised as a result of horizontal road curvature. In other cases, the visibility of a vehicle in front of vehicle 105 to sensors of vehicle 105 can additionally or alternatively be compromised by vertical road curvature and/or vision-obstructing obstacles (e.g., canyon wall, dense vegetation, etc.).

In order to avoid the repetitive acceleration and deceleration (and resulting jerky vehicle performance) that the adaptive cruise control feature of vehicle 105 may effect under such conditions, the adaptive cruise control feature can be configured to operate in a modified operation mode. Operating parameters of the modified operation mode can be selected so as to avoid/mitigate unnecessary acceleration and deceleration in limited visibility conditions. The adaptive cruise control feature of vehicle 105 can be configured to anticipate zones of limited visibility based on received information describing their locations, and to proactively transition to the modified operation mode in conjunction with entering such zones, resulting in a smoother and more enjoyable driving experience.

Figure 4:
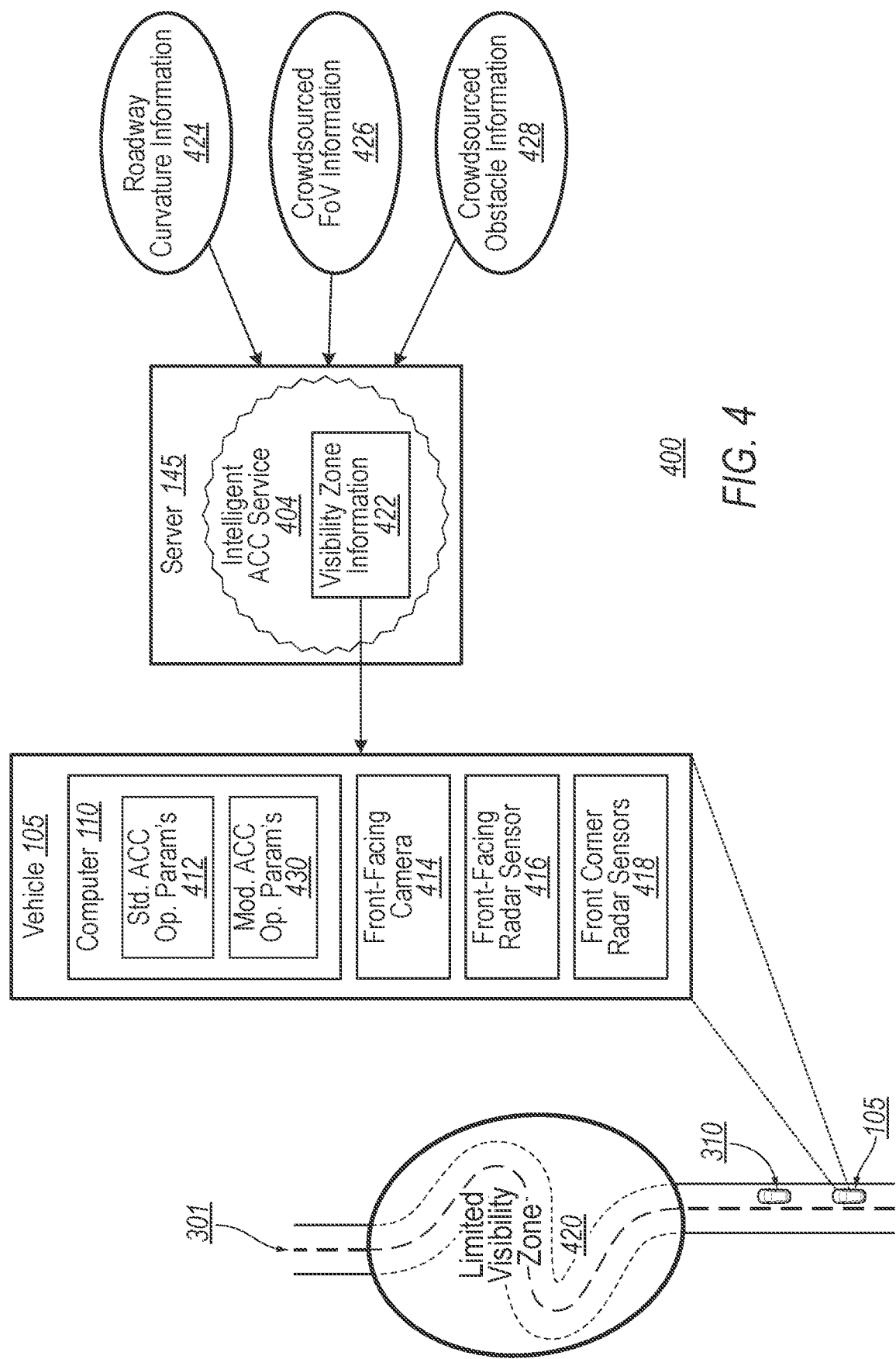
FIG. 4 is a block diagram of a second example system.

FIG. 4 is a block diagram of an example system 400 for intelligent adaptive cruise control according to various implementations. System 400 includes vehicle 105 and server 145 of FIG. 1. System 400 can also include intermediate elements/nodes enabling communication between vehicle 105 and server 145, not withstanding the fact that no such elements/nodes are depicted in FIG. 4. For example, in some implementations, system 400 can include network 135 of FIG. 1, which can convey communications between vehicle 105 and server 145. Server 145 supports/provides an intelligent ACC service 404, to which vehicles such as vehicle 105 can be subscribed in order to enable intelligent ACC functionality for limited visibility zones at those vehicles. Subscription to intelligent ACC service 404 may simply represent an initial activation of the service or opt-in to the service for a particular vehicle, or may represent a subscription agreement according to which payment is provided (e.g., a one time fee, monthly payments, etc.) in exchange for the service.

Like FIGS. 3A and 3B, FIG. 4 reflects a scenario (illustrated at left) in which vehicle 105 travels along roadway 301. Initially, an adaptive cruise control feature of vehicle 105 is set to operate in a standard operation mode. In some implementations, the adaptive cruise control feature may be in an active state, such that it is controlling propulsion power/acceleration in order to maintain a particular target speed. In other implementations, the adaptive cruise control feature may be in an inactive state, such that it is not controlling propulsion power/acceleration.

During operation in the standard operation mode, the adaptive cruise control feature operates in accordance with standard ACC operating parameters 412. Standard ACC operating parameters 412 are parameters, i.e., numeric measurements representing inputs or outputs, governing various aspects/behaviors of the adaptive cruise control feature in the standard operation mode.

In some implementations, standard ACC operating parameters 412 can include an acceleration parameter. In such implementations, the value of the acceleration parameter can specify/represent the forcefulness with which vehicle 105 is to be accelerated back up to its target speed following a determination that the roadway in front of it is clear.

In some implementations, standard ACC operating parameters 412 can include an acceleration delay parameter. In such implementations, the value of the acceleration delay parameter can specify/represent an amount of time that the adaptive cruise control feature should wait before beginning acceleration back up to its target speed following a determination that the roadway in front of it is clear.

In some implementations, standard ACC operating parameters 412 can include a following distance parameter. In such implementations, the value of the following distance parameter can specify/represent a following distance that the adaptive cruise control feature should maintain between vehicle 105 and the vehicle in front of it (e.g., vehicle 310).

In some implementations, standard ACC operating parameters 412 can include one or more sensor orientation parameters. In such implementations, each sensor orientation parameter can specify/represent an orientation for an adjustable sensor of vehicle 105. For instance, in an example implementation, front corner radar sensors 418 can be adjustable sensors, and standard ACC operating parameters 412 can include sensor orientation parameters that specify/represent orientations for front corner radar sensors 418. A particular sensor orientation parameter, according to some implementations, can specify/represent an orientation in a horizontal plane, an orientation in a vertical plane, or a combination of both.

In some implementations, standard ACC operating parameters 412 can include an object detection tolerance parameter. In such implementations, the object detection tolerance parameter can specify/represent a general level of "pickiness" to be applied by an object detection algorithm in scanning for vehicles/objects in front of vehicle 105 based on camera/radar sensor data. Depending on the value of the object detection tolerance parameter, the algorithm may tolerate less or more noise within that data.

As vehicle 105 travels along roadway 301 with its adaptive cruise control feature set to operate in the standard operation mode, computer 110 can monitor the position of vehicle 105 (e.g., based on GPS data). Computer 110 can consult visibility zone information 422 in order to check for the presence of limited visibility zones in the route of travel of vehicle 105. As used herein, the term "limited visibility zone" refers to an area within which visibility of vehicles/objects to sensors (e.g., front-facing cameras, front-facing radar sensors, corner radar sensors, etc.) of trailing vehicles may be compromised as a result of road curvatures, vision-obstructing obstacles, and/or other factors.

Visibility zone information 422 includes information that computer 110 can use to identify the locations of limited visibility zones. Visibility zone information 422 can also include information describing characteristics of such zones (e.g., extents of road curvature, FoV widths needed for complete roadway coverage, sizes of the zones, etc.). In some implementations, visibility zone information 422 can be specific to vehicle 105, such that it identifies areas that are known to be limited visibility zones for vehicle 105. In such implementations, server 145 may compile visibility zone information 422 based on known characteristics of vehicle 105, such as the FoVs and orientations of its camera and radar sensors, knowledge of whether those orientations or FoVs are adjustable, etc. In other implementations, visibility zone information 422 can be non-specific (such that, e.g., it is not specific to a particular model of vehicle). In some implementations in which visibility zone information 422 is non-specific, computer 110 can determine whether a particular limited visibility zone described in visibility zone information 422 applies to vehicle 105 in particular, based on characteristics of vehicle 105. For example, visibility zone information 422 may indicate the presence of a limited visibility zone in which visibility is compromised with respect to front-facing cameras with FoV widths of 50 degrees or less, but computer 110 may determine that the zone does not apply to vehicle 105 because its front-facing camera has an FoV width of 52 degrees.

Server 145 may be configured to generate visibility zone information (e.g., visibility zone information 422) for appropriately-configured vehicles (e.g., vehicle 105) based on any or all of roadway curvature information 424, crowdsourced FoV information 426, and crowdsourced obstacle information 428. Roadway curvature information 424 can be information (e.g., degrees of curvature, curve radii, etc.) indicating the extent of curvature of curved portions of various roadways. In some implementations, server 145 can obtain roadway curvature information 424 by extracting it from map data purchased from a map provider. In some implementations, server 145 can additionally or alternatively obtain roadway curvature information 424 by processing map data crowdsourced from subscribers to intelligent ACC service 404, and/or crowdsourced from some other group(s).

Crowdsourced FoV information 426, which can be crowdsourced from vehicles subscribed to intelligent ACC service 404 and/or crowdsourced from some other group(s), can identify areas in which vehicles have found that the FoVs of their cameras and/or radar sensors have been insufficient to provide uninterrupted coverage of leading vehicles. Crowdsourced obstacle information 428, which can be crowdsourced from vehicles subscribed to intelligent ACC service 404 and/or crowdsourced from some other group(s), can identify locations at which vehicles have found their camera and/or radar sensor coverage compromised by vision-obstructing obstacles. The presence or absence of some types of potentially vision-obstructing obstacles can be time or season-dependent. For instance, in a given section of roadway, deciduous trees may constitute vision-obstructing obstacles while they have leaves, from late spring through early fall, but not while their branches are bare, from late fall through early spring. In some implementations, crowdsourced obstacle information 428 can provide server 145 with current information regarding such time or season-dependent vision-obstructing obstacles.

Based on the position of vehicle 105 and on visibility zone information 422, computer 110 can identify limited visibility zone 420 as a limited visibility zone in the route of travel of vehicle 105. Having identified limited visibility zone 420, computer 110 can cause the adaptive cruise control feature of vehicle 105 to operate in a modified operation mode while vehicle 105 is within limited visibility zone 420. In some implementations, computer 110 can transition the adaptive cruise control feature to the modified operation mode in advance, as vehicle 105 draws near to limited visibility zone 420. In other implementations, computer 110 can transition the adaptive cruise control feature to the modified operation mode as vehicle 105 crosses into limited visibility zone 420, or after vehicle 105 enters limited visibility zone 420.

During operation in the modified operation mode, the adaptive cruise control feature can operate in accordance with modified ACC operating parameters 430. Modified ACC operating parameters 430 are parameters governing various aspects/behaviors of the adaptive cruise control feature in the modified operation mode. It will be understood that the modified ACC operating parameters 430 discussed herein can be determined by empirical testing of different possible parameters 430 in various test scenarios to determine a particular operating parameter 430 to be selected to provide operations as discussed below.

In some implementations, modified ACC operating parameters 430 can include a modified acceleration parameter. In such implementations, the value of the modified acceleration parameter can be selected so that following a determination that the roadway in front of it is clear while in the modified operation mode, vehicle 105 accelerates back up to its target speed less forcefully than it would in the standard operation mode.

In some implementations, modified ACC operating parameters 430 can include a modified acceleration delay parameter. In such implementations, the value of the modified acceleration delay parameter can be selected so that following a determination that the roadway in front of it is clear while in the modified operation mode, the adaptive cruise control feature of vehicle 105 waits longer to begin accelerating back up to its target speed than it would in the standard operation mode.

In some implementations, modified ACC operating parameters 430 can include a modified following distance parameter. In such implementations, the value of the modified following distance parameter can be selected so that the adaptive cruise control feature maintains a larger following distance between vehicle 105 and the vehicle in front of it (e.g., vehicle 310) while in the modified operation mode than it would in the standard operation mode.

In some implementations, modified ACC operating parameters 430 can include one or more modified sensor orientation parameters. In such implementations, the modified sensor orientation parameters can be selected to reorient sensors of vehicle 105 in order provide wider or otherwise improved roadway coverage while in the modified operation mode than is provided in the standard operation mode. For instance, in the aforementioned example in which front corner radar sensors 418 are adjustable sensors, modified ACC operating parameters 430 can include modified sensor orientation parameters that specify/represent adjusted orientations for front corner radar sensors 418.

In some implementations, modified ACC operating parameters 430 can include a modified object detection tolerance parameter. In such implementations, the modified object detection tolerance parameter can be selected so that the object detection algorithm is less "picky"—i.e., tolerates more noise—in scanning for vehicles/objects in front of vehicle 105 while in the modified operation mode than it does in the standard operation mode.

Example possible values for various standard ACC operating parameters 412 and values for corresponding modified ACC operating parameters 430 are presented in Table 1.

TABLE 1

| Parameter | Standard ACC Op. Mode Value | Modified ACC Op. Mode Values |
| --- | --- | --- |
| acceleration | 0.6 m/s$^2$ | 0.3 m/s$^2$ |
| accel. delay | 1 s | 2 s |
| target speed | $S_T$ | $S_T$-c |
| following distance | $D_F$ | 1.25*$D_F$ |
| sensor orientation | 0° horiz./ 0° vert. | +/−20° horiz. +/−10° vert. |
| obj. detection tol. | 1% | 5% |

As reflected in Table 1, in some implementations, the following distance observed in the modified ACC operating mode can be determined as a function of a following distance $D_F$ observed in the standard ACC operating mode. In the depicted example, the following distance observed in the modified ACC operating mode is 25% greater than the following distance $D_F$ observed in the standard ACC operating mode. In some implementations, the value of $D_F$ can depend on driver-specified ACC settings. For example, in some implementations, a driver can select from among short, medium, and long following distance options, and the value of $D_F$ can depend on which option is selected. In some implementations, the value of $D_F$ can be speed-dependent.

For instance, the value of $D_F$ can be lower at slower speeds, and can increase as speed increases.

In some implementations, an iterative process featuring a feedback loop can be used to determine suitable values of modified ACC operating parameters 430. According to such an iterative process, the value of a given parameter can be modified by some amount, and feedback indicating a resulting impact upon the driver experience can then be consulted in order to assess the modification and determine whether/how to further modify the given parameter.

In some implementations, as reflected in Table 1, during operation in the modified operation mode, the adaptive cruise control feature can apply a reduced target speed. For instance, if a driver of vehicle 105 has specified a target speed $S_T$, a reduced target speed of $S_T$-c can be applied during operation in the modified ACC operating mode. The value of c can be speed-dependent, or can be the same regardless of vehicle speed. In some implementations, the reduced target speed can be defined as a fraction/percentage (e.g., 90%) of the target speed $S_T$, where the fraction/percentage can be speed-dependent or can be the same regardless of vehicle speed.

Figure 5:
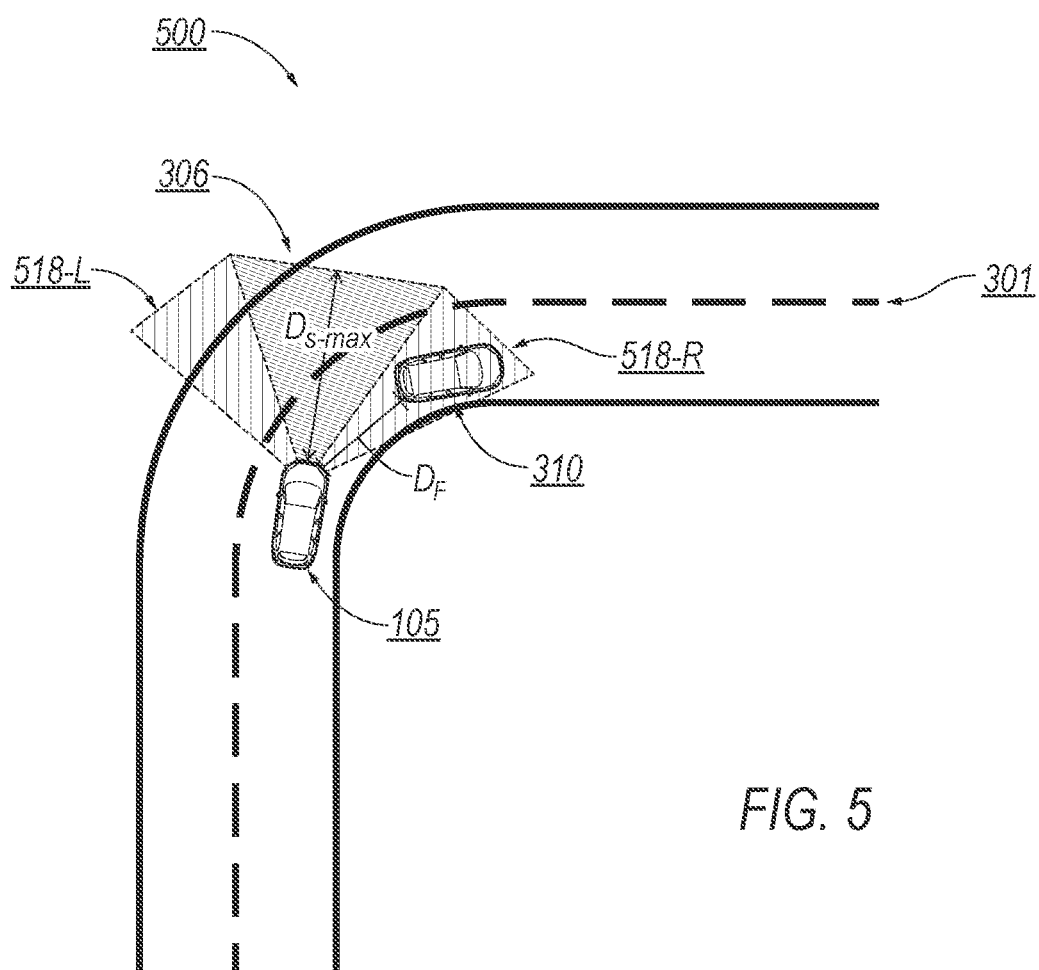
FIG. 5 is a diagram of a third example traffic scene.

FIG. 5 is a diagram of a further example traffic scene 500. In traffic scene 500, as in traffic scene 350 of FIG. 3B, vehicle 310 is outside the FoV 306 of the front-facing camera and front-facing radar sensor of vehicle 105. However, in the scenario reflected in traffic scene 500, front corner radar sensors (e.g., front corner radar sensors 418 of FIG. 4) allow vehicle 105 to view/scan portions of the roadway in FoVs 518-L and 518-R, which are outside of FoV 306. Vehicle 310 is within FoV 518-R, and thus vehicle 105 can detect (based on radar returns of its front right corner radar sensor) the presence of vehicle 310 and its position relative to vehicle 105. However, since vehicle 310 is outside of FoV 306, vehicle 105 cannot obtain visual confirmation (via imaging by its front-facing camera) of the presence and position of vehicle 310 as indicated by those radar returns. In some implementations, while operating in the standard operation mode, the adaptive cruise control feature of vehicle 105 may be required to obtain visual confirmation of radar returns in conjunction with sensing vehicles/object in front of vehicle 105. In such implementations, if the adaptive cruise control feature of vehicle 105 is operating in the standard operating mode in traffic scene 500, it may fail to detect the presence of vehicle 310, despite the fact that vehicle 310 is within FoV 518-R.

In some implementations, the adaptive cruise control feature of vehicle 105 can be permitted to conduct speed control based on radar returns alone (i.e., without visual confirmation) when operating in the modified operating mode. In such implementations, modified ACC operating parameters 430 of FIG. 4 can include a parameter providing the adaptive cruise control feature of vehicle 105 with the ability to control the speed of vehicle 105 based on radar sensor information provided by one or more of front-facing radar sensor 416 and front corner radar sensors 418, without visual confirmation (i.e. confirmation from visual sensor information provided by front-facing camera 414) while operating in the modified operation mode.

Figure 6:
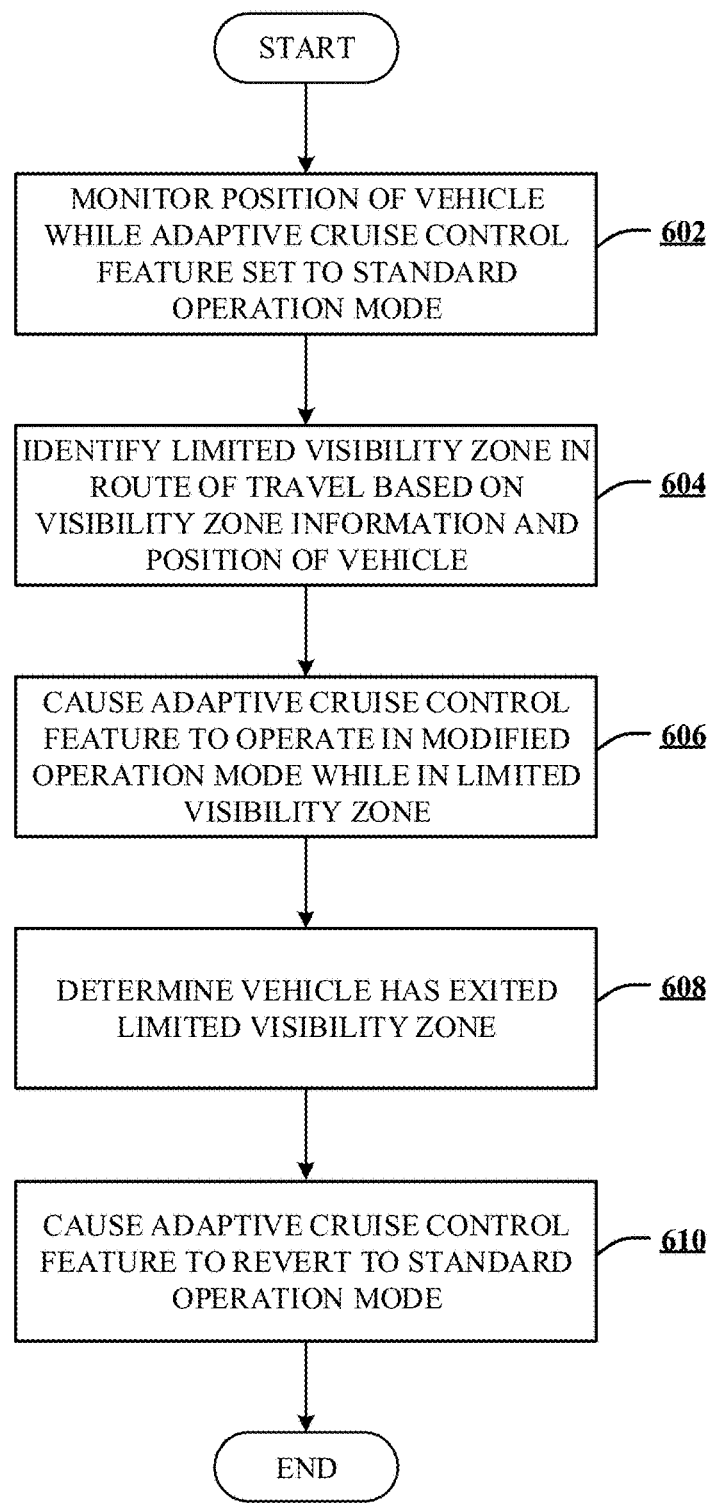
FIG. 6 is a block diagram of an example process flow.

FIG. 6 is a block diagram of a process flow 600, which may be representative of operations executed in various implementations. As shown in process flow 600, a position of a vehicle is monitored at 602 while an adaptive cruise control feature of the vehicle is set to operate in a standard operation mode. For example, computer 110 can monitor a position of vehicle 105 while an adaptive cruise control feature of vehicle 105 is set to operate in a standard operation mode according to standard ACC operating parameters 412. At 604, a limited visibility zone in a route of travel of the vehicle is identified based on visibility zone information and the position of the vehicle. In some implementations, the visibility zone information can be received from a remote server via, e.g., a wireless communication link. For example, computer 110 can identify limited visibility zone 420 based on visibility zone information 422 and the position of vehicle 105.

At 606, the adaptive cruise control feature of the vehicle is caused to operate in a modified operation mode while the vehicle is in the limited visibility zone. During operation in the modified operation mode, the adaptive cruise control feature operates in accordance with one or more modified operating parameters. For example, computer 110 can cause the adaptive cruise control feature of vehicle 105 to operate in a modified operation mode, according to modified ACC operating parameters 430, while vehicle 105 is in limited visibility zone 420. At 608, it is determined that the vehicle has exited the limited visibility zone. For example, computer 110 can determine that vehicle 105 has exited limited visibility zone 420. At 610, the adaptive cruise control feature of the vehicle is caused to revert to the standard operation mode in response to the determination at 608 that the vehicle has exited the limited visibility zone. For example, computer 110 can cause the adaptive cruise control feature of vehicle 105 to revert to the standard operation mode in response to a determination that vehicle 105 has exited limited visibility zone 420.

FIG. 7 illustrates an example storage medium 700. Storage medium 700 may be any non-transitory computer-readable storage medium or machine-readable storage medium, such as an optical, magnetic or semiconductor storage medium. In various implementations, storage medium 700 may be an article of manufacture. In some implementations, storage medium 700 may store computer-executable instructions, such as computer-executable instructions to implement process flow 600. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable type of code, such as source code, compiled code, interpreted code, executable code, static code, dynamic code, object-oriented code, visual code, and the like.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some implementations, the circuitry may be implemented in, or functions associated with the circuitry may be implemented by, one or more software or firmware modules. In some implementations, circuitry may include logic, at least partially operable in hardware.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The present invention is intended to be limited only by the following claims.

What is claimed is:

1. A system, comprising:
a computer having a processor and a memory, the memory storing instructions executable by the processor to:
monitor a position of a vehicle while an adaptive cruise control feature of the vehicle is set to operate in a standard operation mode;
based on the position of the vehicle and on visibility zone information determined at a remote server to apply to the vehicle based on characteristics of the vehicle and then received in the computer from the remote server about a plurality of visibility zones, identify, from the plurality of visibility zones, a plurality of limited visibility zones that are upcoming in a route of travel of the vehicle;
determine respective modified operating parameters for each of the limited visibility zones; and
cause the adaptive cruise control feature to operate in a modified operation mode in the limited visibility zones, wherein during operation in the modified operation mode, the adaptive cruise control feature operates in accordance with one or more modified operating parameters for one of the limited visibility zones in which the vehicle is operating;
wherein the modified operating parameters include a modified acceleration delay parameter that specifies an amount of time that the adaptive cruise control feature should wait before beginning acceleration to return to a target speed while in the modified operation mode;
select the modified acceleration delay parameter based on the visibility zone information while in the modified operation mode;
wherein the visibility zone information is generated based on horizontal roadway curvature information.

2. The system of claim 1, wherein the modified operating parameters further include a modified acceleration parameter.

3. The system of claim 1, wherein the modified operating parameters include a modified target speed parameter.

4. The system of claim 1, wherein the modified operating parameters include a modified following distance parameter.

5. The system of claim 1, wherein the modified operating parameters include one or more modified sensor orientation parameters.

6. The system of claim 1, wherein the modified operating parameters include a modified object detection tolerance parameter.

7. The system of claim 1, wherein, in the standard operation mode, the adaptive cruise control feature of the vehicle obtains visual confirmation of radar returns when sensing another vehicle or an object in front of the vehicle, and the modified operating parameters used in the modified operation mode include a modified operating parameter providing the adaptive cruise control feature with a capability to control vehicle speed based on radar sensor information without the visual confirmation while operating in the modified operation mode.

8. The system of claim 1, wherein the computer receives the information from the remote server via a wireless communication link.

9. The system of claim 1, wherein the memory stores instructions executable by the processor to cause the adaptive cruise control feature to revert to the standard operation mode responsive to a determination that the vehicle has exited the limited visibility zone.

10. A method, comprising:
monitoring a position of a vehicle while an adaptive cruise control feature of the vehicle is set to operate in a standard operation mode;
based on the position of the vehicle and on generated visibility zone information determined at a remote server to apply to the vehicle based on characteristics of the vehicle and then received in the computer from the remote server about a plurality of visibility zones, identifying, from the plurality of visibility zones, a plurality of limited visibility zones that are upcoming in a route of travel of the vehicle;
determining respective modified operating parameters for each of the limited visibility zones; and
causing the adaptive cruise control feature to operate in a modified operation mode in the limited visibility zones, wherein during operation in the modified operation mode, the adaptive cruise control feature operates in accordance with one or more modified operating parameters for one of the limited visibility zones in which the vehicle is operating;
wherein the modified operating parameters include a modified acceleration delay parameter that specifies an amount of time that the adaptive cruise control feature should wait before beginning acceleration to return to a target speed while in the modified operation mode;
select the modified acceleration delay parameter based on the visibility zone information while in the modified operation mode;
wherein the visibility zone information is generated based on horizontal roadway curvature information.

11. The method of claim 10, wherein the modified operating parameters further include a modified acceleration parameter.

12. The method of claim 10, wherein the modified operating parameters include a modified target speed parameter.

13. The method of claim 10, wherein the modified operating parameters include a modified following distance parameter.

14. The method of claim 10, wherein the modified operating parameters include one or more modified sensor orientation parameters.

15. The method of claim 10, wherein the modified operating parameters include a modified object detection tolerance parameter.

16. The method of claim 10, wherein, in the standard operation mode, the adaptive cruise control feature of the vehicle obtains visual confirmation of radar returns when sensing another vehicle or an object in front of the vehicle, and the modified operating parameters used in the modified operation mode include a modified operating parameter providing the adaptive cruise control feature with a capability to control vehicle speed based on radar sensor information without the visual confirmation while operating in the modified operation mode.

17. The method of claim 10, comprising receiving the information from the remote server via a wireless communication link.

18. The method of claim 10, comprising reverting to the standard operation mode responsive to a determination that the vehicle has exited the limited visibility zone.

19. A system, comprising:
a computer having a processor and a memory, the memory storing instructions executable by the processor to:
cause a vehicle to operate an adaptive cruise control feature of a vehicle in an operation mode that is one of a standard operation mode in accordance with standard operating parameters or a modified operation mode in limited visibility zones in accordance with modified operating parameters;
monitor a position of the vehicle while the adaptive cruise control feature of the vehicle is set to operate in the standard operation mode;
based on the position of the vehicle and on information received from a remote server about a plurality of visibility zones, identify, from the plurality of visibility zones, a plurality of limited visibility zones that are upcoming in a route of travel of the vehicle;
determine respective modified operating parameters for each of the limited visibility zones; and
cause the adaptive cruise control feature to operate in the modified operation mode in the limited visibility zones, wherein during operation in the modified operation mode, the adaptive cruise control feature operates in accordance with one or more modified operating parameters for one of the limited visibility zones in which the vehicle is operating;
wherein the modified operating parameters include a modified acceleration delay parameter that specifies an amount of time that the adaptive cruise control feature should wait before beginning acceleration to return to a target speed;
wherein the visibility zone information is generated based on horizontal roadway curvature information.

* * * * *